United States Patent [19]
Eng et al.

[11] Patent Number: 6,064,405
[45] Date of Patent: May 16, 2000

[54] METHOD AND APPARATUS FOR A CACHED VIDEO HARDWARE CURSOR

[75] Inventors: Richard K. Eng; Adrian Muntianu, both of Toronto, Canada

[73] Assignee: ATI Technologies, Inc, Thornhill, Canada

[21] Appl. No.: 09/058,669

[22] Filed: Apr. 10, 1998

[51] Int. Cl.[7] .................................................. G06T 1/60
[52] U.S. Cl. ........................................... 345/507; 345/162
[58] Field of Search .................................. 345/145, 146, 345/162, 501, 507–509, 513, 435, 113, 157

[56] References Cited

U.S. PATENT DOCUMENTS

| | | | |
|---|---|---|---|
| 4,566,000 | 1/1986 | Goldman et al. ..................... | 345/145 |
| 4,987,551 | 1/1991 | Garrett, Jr. ............................ | 345/162 |
| 5,376,949 | 12/1994 | Haigh et al. ........................... | 345/196 |
| 5,389,947 | 2/1995 | Wood et al. ........................... | 345/145 |
| 5,559,533 | 9/1996 | Hicok et al. ........................... | 345/162 |
| 5,621,434 | 4/1997 | Marsh ..................................... | 345/145 |

*Primary Examiner*—Kee M. Tung
*Attorney, Agent, or Firm*—Markison & Reckamp

[57] ABSTRACT

A method for producing a modified cursor in a video graphics display system is accomplished by receiving data corresponding to the modified cursor and comparing the received data with cached cursor information. If the comparison produces a favorable result, a pointer is stored in a cursor offset register, where the pointer corresponds to a data set in video memory that describes the modified cursor in a video format. When the comparison produces an unfavorable result, a video format data set is generated for the modified cursor and is stored in the video memory. A pointer to the new video format data set is stored in the cursor offset register, and at least a portion of the received data is stored with the cached cursor information.

20 Claims, 5 Drawing Sheets

METHOD AND APPARATUS FOR A CACHED VIDEO HARDWARE CURSOR

FIELD OF THE INVENTION

The invention relates generally to video graphics processing and more particularly to a method and apparatus for caching a video hardware cursor.

BACKGROUND OF THE INVENTION

Computers are used in many applications. In order to facilitate user interaction, the video display of a computer typically includes a cursor, which informs the user with which part of the screen the user is interacting. For example, if the user is working in a text editor, the cursor may indicate where the next characters that are typed will appear. Cursors can take various shapes, or representations, and the shape can depend on the next type of action that will be performed in response to the user. One representation of the cursor may indicate that the user will select text, another may indicate that graphics will be selected, while yet another may indicate that text is to be inserted.

Because cursors can move freely about the screen and often should not affect the material over which they are travelling, they are typically treated as overlay video graphics elements. Video graphics elements include elements that may be used in a video application, such as one that interacts with a television picture. Video graphics elements also include elements used with the displaying and processing of graphics which may be related to a computer display. Video elements as described herein are meant to include those used in graphics applications, and vice-versa. Overlay video graphics elements take precedence over other video elements when the image to be displayed is prepared. For example, if an overlay video graphics element, such as a cursor, is positioned over a portion of a text character, the cursor will effectively "cover up" the portion of the text character that occupies the same space as the cursor.

Typically, information to be displayed as part of a video graphics system is stored in a video memory that is read by a cathode ray tube (CRT) controller. The CRT controller controls generation of the image based on the contents of the video memory. The video memory is structured such that a physical location of the display corresponds to a specific portion of the video memory. In a software cursor implementation, the cursor must be "redrawn" in video memory each time it moves to a new location. When the cursor is redrawn, the information that the cursor was covering before the move must be refreshed. This repeated redrawing can use a great deal of processing power, and therefore adversely affect performance.

Hardware cursor implementations have been known to reduce the processing power necessary to display and update cursors. In a hardware cursor implementation, the information describing a single cursor representation is stored in a predetermined location of video memory. The information that describes the screen image without the cursor is stored elsewhere in the video memory. The information from the cursor portion of the video memory is then combined with that storing the screen image to produce the final image. In such a system, when the cursor moves, the cursor placement does not affect the non-cursor information in memory. The position of the cursor in relation to the screen image is stored in a register. As the CRT controller scans the memory it compares the value in the register (the cursor position) with its current location in video memory. When the CRT controller reaches the location of the cursor, it reads the information in the cursor portion of the video memory rather than the information that describes the screen image at that point.

Although a hardware cursor setup reduces some of the processing power required to support a cursor, some sequences of commands require numerous changes of the cursor image as well as position. In order to modify the cursor image, data describing the cursor in a video format that is compatible with the CRT controller must be written in the portion of video memory allocated to the cursor. Numerous changes of the cursor image, or visual representation, can require a great deal of processing power and bus bandwidth as video format data must be generated and written to the video memory with each change.

Consequently, a need exists for a hardware cursor system that requires less processing power and bus bandwidth in order to accommodate frequent cursor changes.

DETAILED DESCRIPTION OF A PREFERRED EMBODIMENT OF THE INVENTION

Generally, the present invention provides a method and apparatus for producing a modified cursor in a video graphics display system. This is accomplished by receiving data corresponding to the modified cursor and comparing the data with cached cursor information. If the comparison produces a favorable result, a pointer is stored in a cursor offset register, where the pointer corresponds to a data set in video memory which describes the modified cursor in a video format. When the comparison produces an unfavorable result, a video format data set is generated for the modified cursor and is stored in the video memory. A pointer to the new video format data set is stored in the cursor offset register, and at least a portion of the received data is stored with the cached cursor information. By caching the cursor information, modifications to the cursor can be implemented more quickly and using fewer processor and bus resources.

Figure 1:
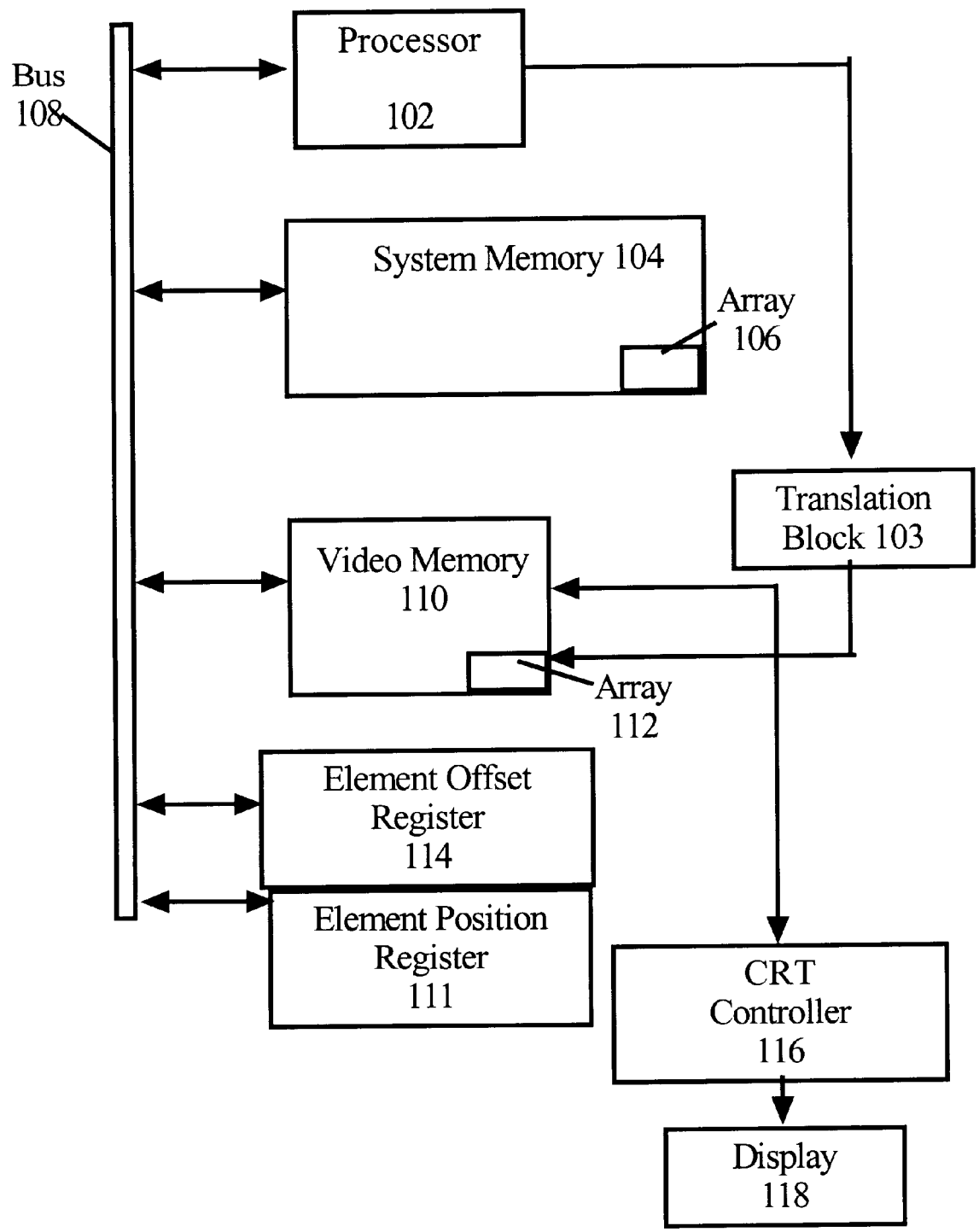
FIG. 1 illustrates a block diagram of an apparatus for generating an overlay video graphics element in accordance with the present invention.

FIG. 1 illustrates a video graphics system that includes a processor 102, a system memory 104, a video memory 110, an element offset register 114, an element position register 111, a bus 108, a CRT controller 116, and a display 118. The system illustrated is designed to support overlay video graphics elements, which include cursors and other graphical elements that overlay other video information present on the display. Overlay video graphics elements are allocated space in the video memory 110 such that the video information describing the underlying image is not corrupted by the information describing the overlay video graphics elements. This allocated space includes the video memory array 112.

In one embodiment, the CRT controller 116 reads the data in the video memory 110 and provides it to the display 118.

The display 118 may be a device that accepts digital information and displays it directly. Alternatively, the display may require an analog signal, in which case the system circuitry includes a digital-to-analog converter (DAC) that converts the data to analog format. The video memory 110 is structured such that physical locations of the display 118 map directly to locations in the video memory 110. As the CRT controller 116 reads locations in the video memory 110, the controller 116 compares its present position in the video memory 110 with the value in the element position register 111 which stores the location of the overlay video element. When the controller 116 reaches the location of the overlay video element, the controller 116 retrieves the video information corresponding to the overlay video element for output to the display 118. This is accomplished by reading the element offset register 114 which stores a pointer to the video-memory array 112 which stores a plurality of data sets. Each of the data sets in the array 112 stores video format data that describes a particular configuration of an overlay video element. The video format data in the data sets is compatible with the CRT controller 116 or another device that utilizes the data in the video memory 110 for display purposes.

Figure 2:
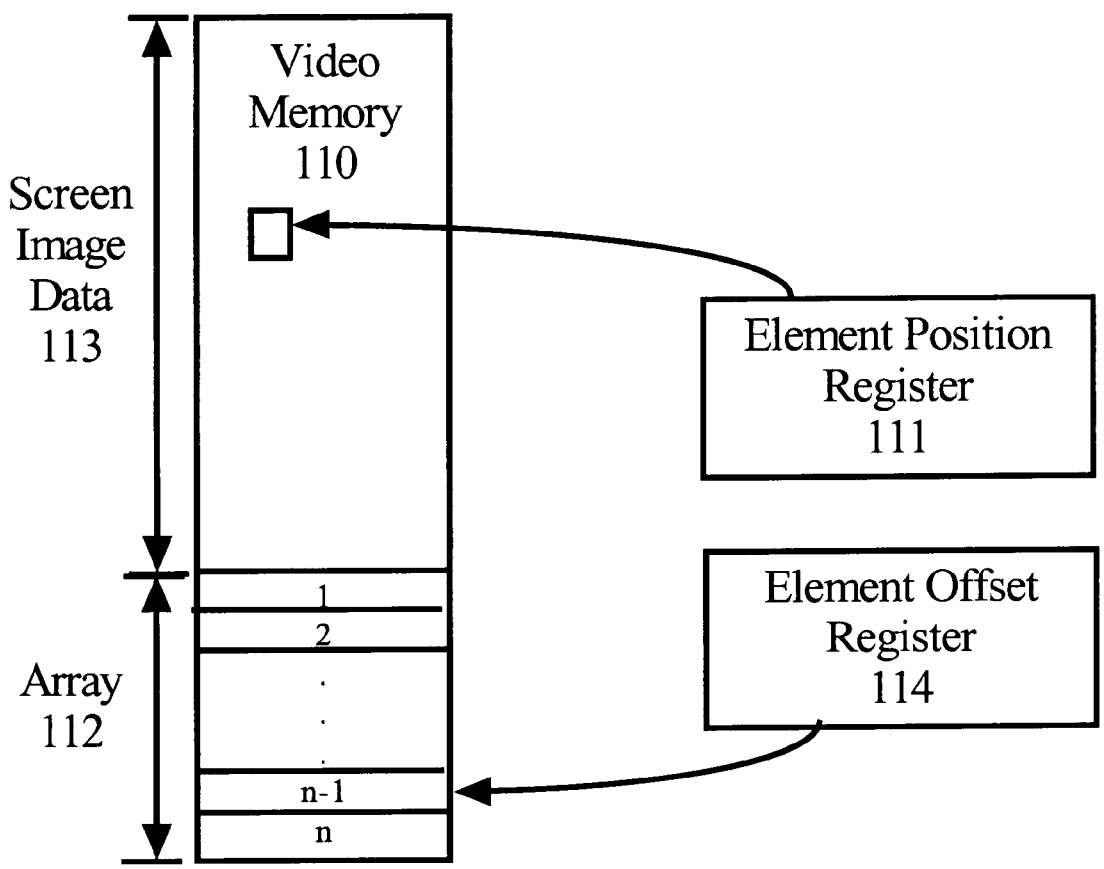
FIG. 2 illustrates a block diagram of a video memory and related registers in accordance with the present invention.

The structure of the video memory 110 and its relationship to the element position register 111 and the element offset register 114 can be better understood by referring to FIG. 2. FIG. 2 illustrates the video memory 110, which includes screen image data 111 and video-memory array 112. The screen image data 113 is a digital image of the image eventually produced on display 118. However, the screen image data 113 is overlapped on the screen by an overlay video element, the position of which is shown by the small rectangle within the screen image data portion of the video memory 110. Note that this rectangle is for illustrative purposes only, and no data concerning the overlay video element Is present in this portion of the video memory 110. Instead, the portion of the screen image data 113 that underlies the overlay graphics element remains intact in the video memory 110.

The position of the overlay video graphics element is stored in the element position register 111, which is monitored by the CRT controller 116 as it reads data from the video memory 110. When the CRT controller 116 reaches the point in the video memory 110 where the overlay video graphics element is positioned (which it determines through comparison with the element position register 111), it reads the pointer in the element offset register 114. The element offset register 114 directs the CRT controller 116 to one of the data sets stored in the video-memory array 112. The pointer in the element offset register 114 points to the video format data set that properly describes the current image of the overlay video graphics element. The CRT controller 116 reads the data from the selected video format data set and multiplexes it with the data stream read from the screen image data 113 portion of the video memory 110 to produce the displayed image.

Typically the video-memory array 112 will include "n" data sets, where "n" is a number that is selected based on how many different images of the overlay video graphics element can be practically and efficiently stored and used. Preferably, "n" is greater than one and optimizes the efficiency of the system. In such a system, a large number of stored images may be less efficient because many images will have to be chosen from, and not enough images may be less efficient because it requires generation of more images not present in the video memory array 112.

Returning to FIG. 1, processor 102 receives overlay video graphics element data that corresponds to the desired image of the overlay video graphics element. The overlay video graphics data, or received data, may be in a many possible formats. For example, the received data may be in a format which is compatible with the CRT controller 116, the data may be a selection sequence that selects from a set of images, or the data may be a bit-mapped version of the desired image. In other embodiments, the received data is such that it describes the image so that each image is uniquely identifiable by the received data. The processor 102 includes instructions that compare the received data with data sets in the system-memory array 106.

The comparison of the received data with the data sets in the system-memory array 106 may be accomplished by the processor 102 or by additional hardware dedicated to performing such a comparison. Note that the processor 102 may be directly coupled to the system memory 104, thus allowing the processor 102 to access data in the system memory 104 without use of the bus 108. The comparison may include sampling the received data prior to the comparison where the sampled version of the data is understood to adequately identify particular images, or video representations, of the overlay video graphics element. The comparison may be performed such that successive data sets are eliminated in the array as mismatches occur, where data points from a predetermined sampling pattern are used for comparison. It should be obvious to one skilled in the art that a comparison technique can be developed to determine a favorable/unfavorable comparison in a minimum amount of time and with a minimum amount of processing power.

When there is a favorable comparison between the received data and a data set in the system-memory array 106, the processor 102 stores a pointer in the element offset register 114 that identifies the video graphics data corresponding to the particular representation described by the received data. Each set of video graphics data stored in the video-memory array 12 has a corresponding set of data in the system-memory array 106. In embodiments where the received data describes the element rendition in a format not compatible with the CRT controller 116, the system-memory array 106 stores data in this format to promote comparison, while the video-memory array 112 stores corresponding video graphics data that is compatible with the CRT controller 116. Thus, when a match is determined between the received data and data in the system-memory array 106, the processor 102 stores a pointer in the element offset register 114 that points to the set of data in video format that corresponds to the matched data in the system-memory array 106.

If there is an unfavorable comparison (i.e., no match) between the received data and the system-memory array 106, the processor 102 may execute a second set of instructions such that a new video graphics data set is generated. The new video graphics data set provides a video format description of the overlay video graphics element image described by the received data. This new data set is stored in the video-memory-array 112. Preferably, the new data set replaces one of the currently stored data sets. The data set replaced may be the least-recently used data set.

The processor 102 stores a pointer in the element offset register 114 that corresponds to the new data set in video memory 110. The processor 102 also stores at least a portion of the received data in the system-memory array 106. Preferably, the system-memory array 106 has the same number of entries as the video-memory array 112, and the replacement scheme for entries in the two arrays is the same. The portion of the received data is determined based on the comparison scheme being employed. When a sampled version of the received data is used for comparison, only the sampled version need be stored in the system-memory array 106.

In an alternative embodiment, the video graphics system includes translation block 103 that receives the overlay video graphics data and produces the new data set that describes the overlay video graphics data in video format. When the overlay video graphics data compares unfavorably with the data sets in the system memory array 106, the new data set generated by the translation block 103 is stored in the video memory array 112. As in the embodiment described above, the processor 102 may include instructions such that it stores the pointer corresponding to the new video format data set in the element offset register 114 and stores at least a portion of the received data in the system memory array 106.

In yet another embodiment, the video graphics system may be a portion of a computer system in which the processor 102 is a display driver that receives requests to modify a hardware cursor from a graphics display interface (GDI). The GDI issues a request to rebuild the cursor, where the request includes data that describes the desired cursor. The display driver, or processor 102, compares the received data with an array of data sets 106 stored in the system memory 104. Some or all of the data sets of the array 106 may be stored in an internal cache of the processor 102, which improves the speed of the comparison.

Figure 3:
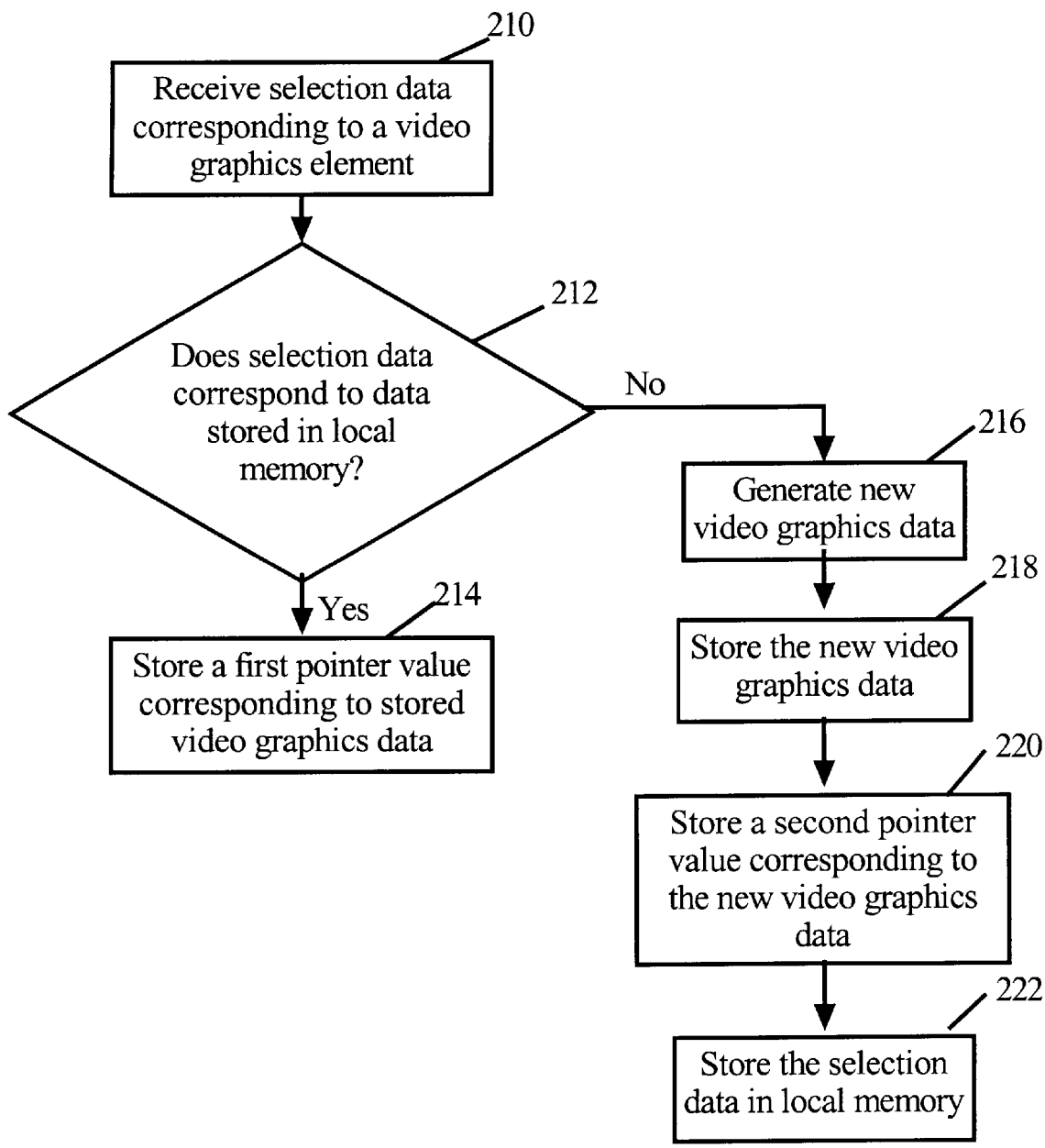
FIG. 3 illustrates a flow chart of a method for producing an overlay video graphics element in accordance with the present invention.

FIG. 3 illustrates a flow chart of a method for producing an overlay video graphics element that is associated with a physical display location. The physical display location is, in turn, associated with a position in a video memory that supports the display. At step 210, selection data is received. The selection data corresponds to the overlay video graphics element, which may be may be a cursor. In one embodiment, the selection data is a bit map of the graphical representation of the cursor, where the bit map is not the proper format for storage in the video memory.

At step 212, it is determined whether or not the selection data corresponds to data stored in local memory. Local memory is memory easily accessed by a processor, and may include system memory or a cache memory within the processor. The data in local memory with which the selection memory is compared may be stored in an array, wherein each member of the array includes data that describes a particular graphical representation of the overlay video graphics element.

Determining whether or not the selection data has corresponding data in local memory may include sampling the selection data prior to comparison. For example, if a subset of the selection data is adequate to uniquely distinguish all of the possible graphical representations, the selection data is sampled to eliminate data which is irrelevant to the comparison. Further, the order in which specific data are compared may be altered such that the time and processing requirements of the comparison are minimized.

If it is determined that the selection data has corresponding data in local memory, (i.e. a match, or cache hit), the method proceeds to step 214. At step 214, a pointer is stored, where the pointer value is based on the corresponding data in local memory. The pointer value corresponds to, or points to, video graphics data that is used to produce the overlay video graphics element. Typically, the video graphics data will be stored in an array in the video memory. Each element of the video memory array describes a particular rendition of the overlay video graphics element, and each element of the video memory array corresponds to an element of the local memory array. In such an embodiment, each element of the local memory array may store information as to the location of its corresponding element in the video memory array, or the corresponding element may be determined based on the addressing relationship between the two memory arrays.

If no corresponding data is found at step 212, the desired rendition of the overlay video graphics element is not currently stored in the video memory (which has been determined by the lack of a match with the corresponding array entries in local memory). Thus, the video graphics data for the desired rendition must be generated such that the overlay video graphics element can be displayed.

At step 216, a new set of video graphics data is generated based on the selection data, where the new set of video graphics data is used to produce the overlay video graphics element. The new set of data may be generated by the processor or by an overlay video graphics data generator which includes circuitry adapted to receiving the selection data and producing video graphics data.

At step 218, the new video graphics data is stored. This may include storing the new video graphics data in the video memory, and, if the video memory stores this data in an array format, storing the new video graphics data in the array. If the data is stored in an array the data may be stored in the least recently used portion of the array.

At step 220, a pointer value is stored which corresponds to the location of the new video graphics data. This allows the data to be read such that the overlay video graphics element can be displayed. At step 222, at least a portion of the selection data is stored in the local memory. This step updates the local memory to show the existence of the new video graphics data. Thus, if the same selection data is received in the future, the step of determining a match with local memory will produce a positive result, and the new video graphics data will not have to be regenerated. Only a portion of the selection data may need to be stored if the system samples incoming selection data. The portion of the selection data stored corresponds to the sampled data. The portion of the selection data that is stored in local memory may also include information pertaining to the location of its corresponding video graphics data set, or the location of the corresponding data set may be determined by the memory addressing used in the array structures.

Figure 4:
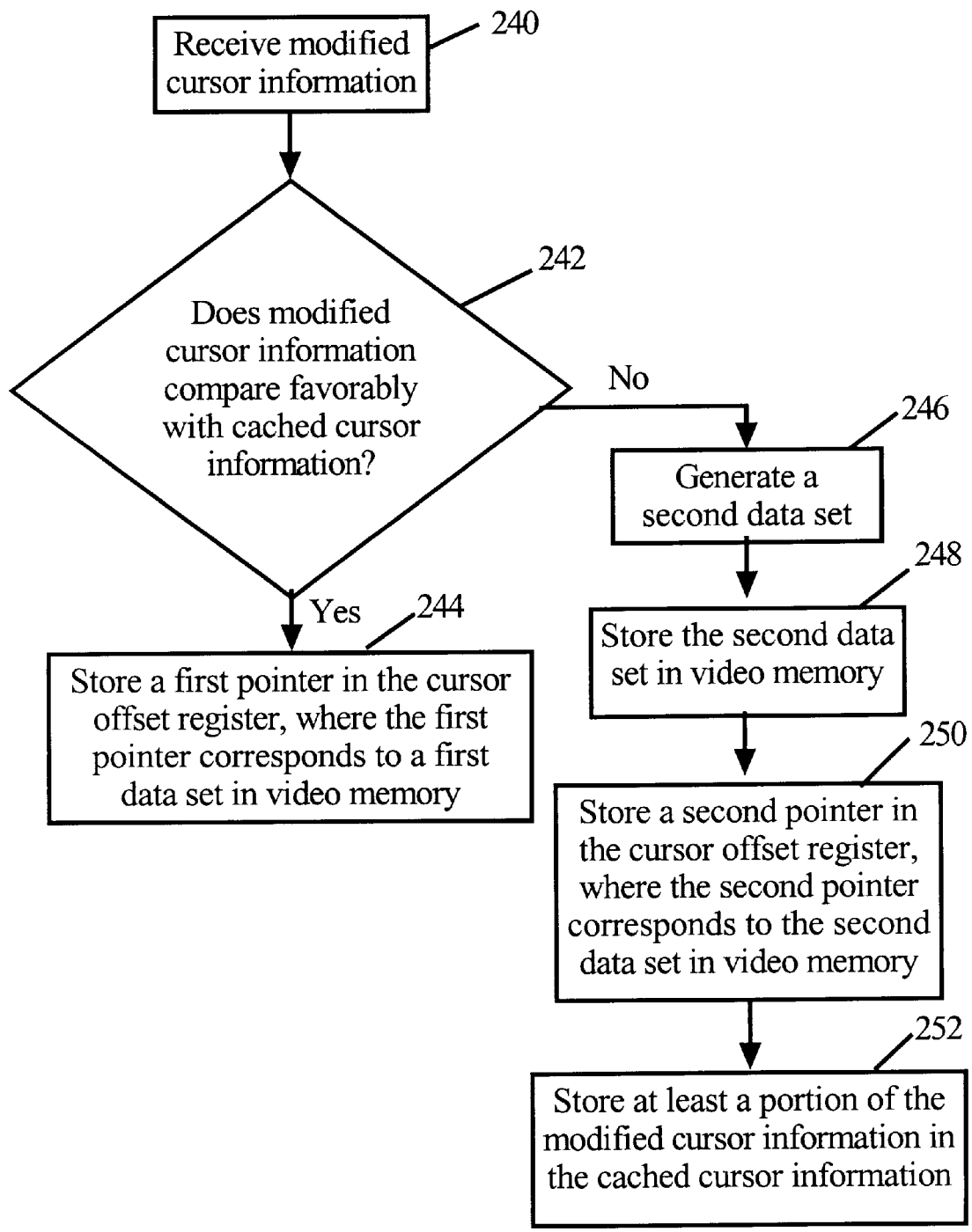
FIG. 4 illustrates a flow chart of a method for producing a modified cursor in accordance with the present invention.

FIG. 4 illustrates a method for producing a modified cursor more quickly and using fewer processor resources than software cursor implementations and prior art hardware cursor implementations. At step 240, modified cursor information is received. The modified cursor information describes the modified cursor in a first format. The first format may not be compatible with the circuitry used to display the cursor.

At step 242, the modified cursor information is compared with cached cursor information. This step is similar to step 212 of FIG. 3. The cached cursor information may be stored in an array in local memory. The method of comparison may be one of the comparison methods discussed in the description of step 212 above, where some of the methods require only a portion of the modified cursor information.

If a favorable comparison is determined at step 242, the method proceeds to step 244. At step 244, a pointer is stored in a cursor offset register, where the pointer corresponds to a data set in a video memory that describes the modified cursor in a format that is compatible with the circuitry used to display the cursor. This pointer allows the display circuitry to access the correct video-format data describing the modified cursor.

If the comparison at step 242 is unfavorable, the method progresses to step 246. At step 246, a data set is generated that describes the modified cursor information in the display-format. This generated data set is stored in the video memory, where the video memory may store data sets in an array similar to that described in the discussion of FIG. 3 above. At step 250, a pointer is stored to the cursor offset register that corresponds to the data set stored at step 248. This enables the display circuitry to retrieve the data necessary to display the modified cursor. At step 252, at least a portion of the modified cursor information is stored in the cached cursor information for future comparisons with received data.

By determining that the modified cursor information that has been received already has a display-format data set stored in the video memory, a system using the method depicted in FIG. 4, is able to avoid translating the received cursor information to the display-format. In systems where the cursor is modified often, this can offload a great deal of translation from the processor, thus increasing system speed and efficiency. The method also stores newly-generated display-format data sets for future use, and may replace least-recently or least-frequently used data sets with these newly-generated data sets in order to conserve video memory space.

Figure 5:
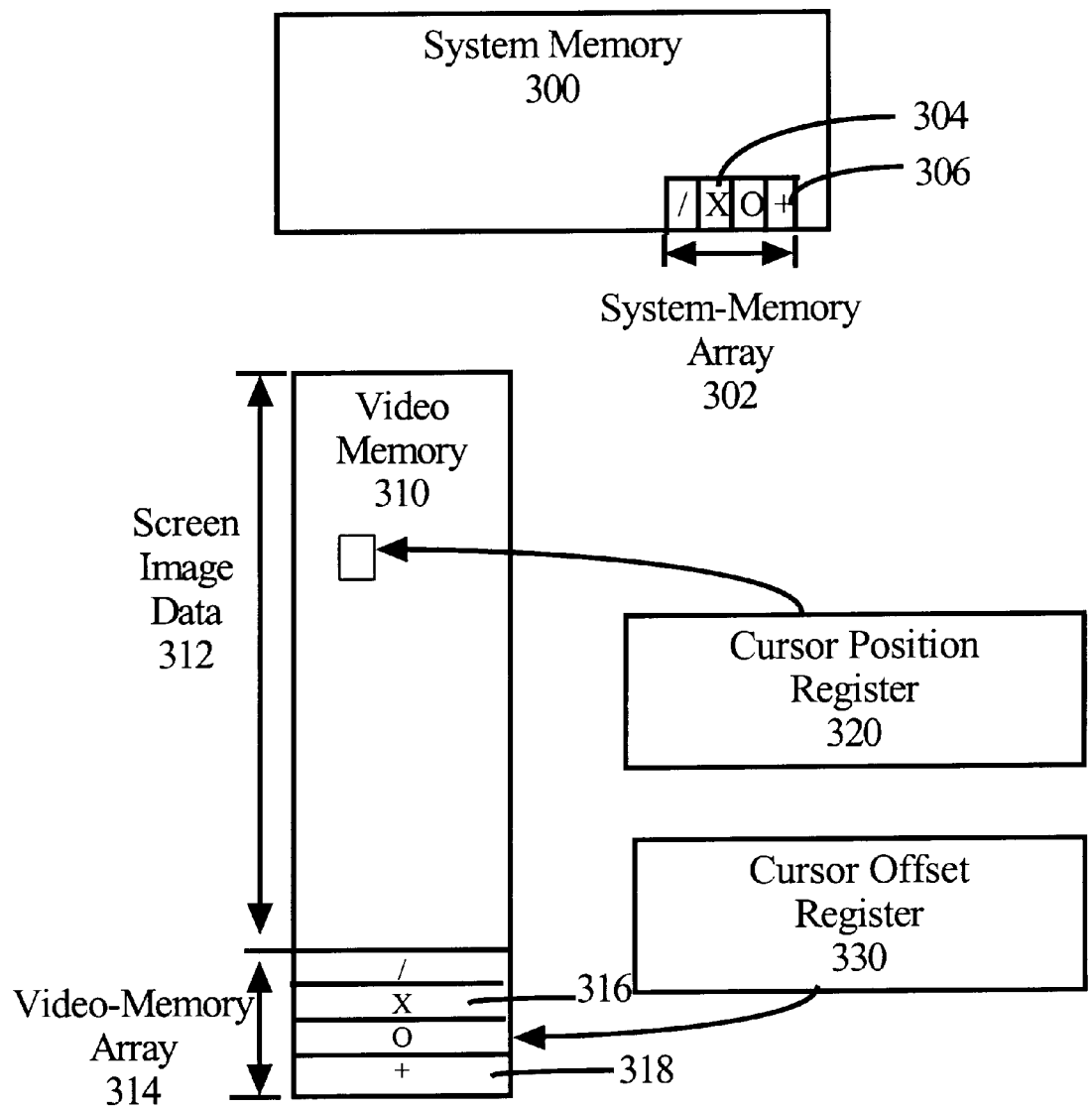
FIG. 5 illustrates a block diagram of circuitry used in caching cursor data in accordance with the present invention.

A portion of a system used to implement the methods of FIGS. 3–4 is illustrated in FIG. 5 to clarify understanding of the present invention. This example illustration is provided to further insight into the memory structures used to cache overlay video graphics elements, and more particularly, cursors. FIG. 5 illustrates system memory 300, video memory 310, cursor position register 320, and cursor offset register 330. System memory 300 includes system-memory array 302, which, in the example shown, contains four elements that describe four potential cursor representations. Video memory 310 includes screen image data 312, and video-memory array 314. The video-memory array 314 has four elements, each corresponding to an element in the system-memory array. Cursor position register 320 contains data that monitors the position of the cursor with respect to the screen image data 312. Cursor offset register 330 indicates which element of the video-memory array 314 holds the video data corresponding to the present representation of the cursor.

Assume that the system receives a request to display a cursor representation that corresponds to the "X" shown in both arrays 302 and 314. The data of the incoming request is compared with the data in the system-memory array 302, and a match is found with element 304. This favorable comparison causes the system to store a new pointer value in the cursor offset register 330. The pointer corresponds to element 316 of the video-memory array 314, and allows the system to access the data stored in element 316 to display the correct cursor representation.

Assume that the system later receives a request to display a cursor representation that corresponds to "I", where the "1" representation has not been displayed recently, and therefore has no corresponding data in either array 302 or 314. When the data of the incoming request is compared with the system-memory array 302, no match is found. This unfavorable comparison requires the system to generate a video-data representation corresponding to the desired cursor representation. This newly generated set of video data is then stored in the video-memory array 314. In a preferred embodiment, the newly generated set replaces the least-recently used element of the video-memory array 314. Assuming that the "+" representation is the least-recently used representation, the newly generated data set is stored in element 318 of the video memory 314.

The system then updates the cursor offset register to point to element 318 of the video memory 314. The system also stores at least a portion of the received data in element 306 of the system-memory array 302. If the system receives another request for the "I" cursor in the future, the comparison with the cached cursor data in the system-memory array 302 will be favorable, and the video data corresponding to the "I" representation will not have to be regenerated.

The method and apparatus described above allow for cursors and other overlay video graphics elements to change their appearance frequently while using fewer processing resources and time than is required by prior hardware cursor and software cursor systems. This may be especially true in systems executing automated routines such as macros and predetermined test sequences that require many changes to the cursor.

It should be understood that the implementation of other variations and modifications of the invention in its various aspects will be apparent to those of ordinary skill in the art, and that the invention is not limited by the specific embodiments described. For example, the sizes of the system-memory and video-memory arrays may be optimized to satisfy the requirements of a specific system. It is therefore contemplated to cover by the present invention, any and all modifications, variations, or equivalents that fall within the spirit and scope of the basic underlying principles disclosed and claimed herein.

What is claimed is:

1. A method for producing an overlay video graphics element, the method comprising:
   receiving selection data corresponding to the overlay video graphics element, wherein the overlay video graphics element is associated with a physical display location;
   determining whether the selection data has corresponding data stored in local memory; and
   when the selection data has corresponding data stored in local memory, storing a first pointer value based on the corresponding data, wherein the first pointer value corresponds to first video graphics data, wherein the first video graphics data is used to produce the overlay video graphics element.

2. The method of claim 1 further comprises:
   when the selection data does not have corresponding data stored in local memory, generating second video graphics data based on the selection data, wherein the second video graphics data is used to produce the overlay video graphics element.

3. The method of claim 2 further comprises:
   when the selection data does not have corresponding data stored in local memory:
      storing the second video graphics data in a predetermined memory location; and
      storing a second pointer value corresponding to the second video element data set.

4. The method of claim 3 further comprises, when the selection data does not have corresponding data stored in local memory, storing at least a portion of the selection data in local memory, wherein the at least a portion of the selection data corresponds to the second video graphics data.

5. The method of claim 4 further comprises storing the at least a portion of the selection data in a least recently used portion of an array of cached element data in the local memory.

6. The method of claim 3 further comprises storing the second video graphics data in a least recently used portion of an array of cached video data.

7. The method of claim 3 further comprises storing the second video graphics data in a video memory.

8. The method of claim 2 further comprises generating the second video graphics data using an overlay video element data generator, wherein the overlay video element data generator includes circuitry which receives the selection data and produces the second video graphics data.

9. The method of claim 1, wherein the selection data includes information which describes a cursor.

10. A method for producing a modified cursor comprising:
receiving modified cursor information, wherein the modified cursor information describes the modified cursor in a first format;
comparing at least a portion of the modified cursor information with cached cursor information;
when the at least a portion of the modified cursor information compares favorably with the cached cursor information, storing a first pointer in a cursor offset register, wherein the first pointer corresponds to a first data set in a video memory which describes the modified cursor in a second format; and
when the at least a portion of the modified cursor information compares unfavorably with the cached cursor information:
generating a second data set that describes the modified cursor in the second format;
storing the second data set in the video memory;
storing a second pointer in the cursor offset register, wherein the second pointer corresponds to the second data set; and
storing the at least a portion of the modified cursor information such that the at least a portion of the modified cursor information is included in the cached cursor information.

11. The method of claim 10, wherein storing the second data set further comprises storing the second data set in an array of data sets in the video memory, wherein the second data set replaces a data set of the array of data sets.

12. The method of claim 10, wherein storing the at least a portion of the modified cursor information further comprises storing the at least a portion of the modified cursor information in an array in system memory that stores the cached cursor information, wherein the at least a portion of the modified cursor information replaces a portion of the cached cursor information.

13. The method of claim 10, wherein the step of comparing further comprises sampling the modified cursor information to produce the at least a portion of the modified cursor information, wherein sampling is based on a set of potential cursors.

14. The method of claim 10, wherein comparing further comprises comparing the at least a portion of the modified cursor information with cached cursor information stored in an internal cache within a processor.

15. An apparatus for generating an overlay video graphics element comprising:
system memory, wherein the system memory stores a first array of data sets corresponding to a plurality of video graphics elements;
video memory, wherein the video memory stores a second array of data sets corresponding to the first array, wherein each data set of the second array provides a video format description of a corresponding one of the plurality of video graphics elements;
an element offset register, wherein the element offset register stores a pointer to a selected data set of the second array; and
a processor operably coupled to the system memory, the video memory, and the element offset register, wherein the processor receives overlay video graphics element data which corresponds to the overlay video graphics element, wherein the processor includes a first set of instructions such that:
when the overlay video graphics data compares favorably with a first data set of the first array, the processor stores a pointer to a first data set of the second array in the element offset register, wherein the first data set of the second array corresponds to the first data set of the first array, and wherein the first data set of the second array describes the overlay video graphics element in video format.

16. The apparatus of claim 15, wherein the processor includes a second set of instructions such that when the overlay video graphics data compares unfavorably with the data sets of the first array, the processor includes a second set of instructions such that the processor:
generates a new data set that provides a video format description of the overlay video graphics element;
stores the new data set in the second array of data sets;
stores a new pointer in the element offset register, wherein the new pointer corresponds to the new data set; and
stores at least a portion of the overlay video graphics data in the first array of data sets.

17. The apparatus of claim 16, wherein data sets in the first array of data sets include sampled versions of overlay video graphics data.

18. The apparatus of claim 15 further comprises a translation block operably coupled to the processor and the video memory, wherein the translation block receives the overlay video graphics data and produces a new data set that describes the overlay video graphics element in video format such that when the overlay video graphics data compares unfavorably with the data sets of the first array, the new data set is stored in the second array of data sets.

19. The apparatus of claim 18, wherein the processor includes a second set of instructions such that when the overlay video graphics data compares unfavorably with the data sets of the first array, the processor:
stores a new pointer in the element offset register, wherein the new pointer corresponds to the new data set; and
stores at least a portion of the overlay video graphics data in the first array of data sets.

20. The apparatus of claim 15, wherein the processor includes an internal cache, which stores at least a portion of the first array of data sets.

* * * * *